US011768325B2

(12) United States Patent
Hiramoto et al.

(10) Patent No.: US 11,768,325 B2
(45) Date of Patent: Sep. 26, 2023

(54) DISPLAY DEVICE, ILLUMINATION DEVICE, AND LIGHT GUIDING MEMBER

(71) Applicant: Japan Display Inc., Tokyo (JP)

(72) Inventors: Koji Hiramoto, Tokyo (JP); Masafumi Okada, Tokyo (JP); Hiroshi Nakamoto, Tokyo (JP); Ken Kagabu, Tokyo (JP); Ken Sugiyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 2 days.

(21) Appl. No.: 17/742,653

(22) Filed: May 12, 2022

(65) Prior Publication Data
US 2022/0268986 A1 Aug. 25, 2022

Related U.S. Application Data

(63) Continuation of application No. 17/357,145, filed on Jun. 24, 2021, now Pat. No. 11,333,818, which is a (Continued)

(30) Foreign Application Priority Data

Dec. 27, 2018 (JP) ................................ 2018-245958

(51) Int. Cl.
*F21V 8/00* (2006.01)
*G02F 1/13357* (2006.01)

(52) U.S. Cl.
CPC ......... *G02B 6/0045* (2013.01); *G02B 6/0021* (2013.01); *G02B 6/0066* (2013.01); *G02B 6/0073* (2013.01); *G02F 1/133603* (2013.01)

(58) Field of Classification Search
CPC .. G02B 6/0021; G02B 6/0066; G02B 6/0045; G02B 6/0073; G02F 1/133603; G02F 1/133606–133607
See application file for complete search history.

(56) References Cited

U.S. PATENT DOCUMENTS

2004/0208003 A1* 10/2004 Kuo ..................... G02B 6/0046
362/241
2009/0059125 A1* 3/2009 Nagayoshi ........ G02F 1/133611
349/64
(Continued)

FOREIGN PATENT DOCUMENTS

CN 102829392 A 12/2012
CN 105759500 A 7/2016
(Continued)

OTHER PUBLICATIONS

International Search report dated Nov. 19, 2019 in Application No. PCT/JP2019/039399.
(Continued)

*Primary Examiner* — Mariceli Santiago
(74) *Attorney, Agent, or Firm* — K&L Gates LLP

(57) ABSTRACT

Display device is provided and includes display panel; and illumination device provided on rear surface side of display panel, wherein illumination device includes light sources, and light guiding member arranged at rear surface side of display panel, light guiding member has holes which penetrates the light guiding member, light sources are housed in corresponding hole, rear surface of light guiding member has first inclined surface inclined upwardly from light source housed in one of holes, front surface side of light guiding member has second inclined surface inclined upwardly from light source housed in one of the holes, and angle of first inclined surface to center line of one of holes is greater than angle of second inclined surface to center line.

21 Claims, 11 Drawing Sheets

Related U.S. Application Data continuation-in-part of application No. PCT/JP2019/039399, filed on Oct. 4, 2019.

(56) References Cited

U.S. PATENT DOCUMENTS

| | | |
|---|---|---|
| 2015/0124484 A1 | 5/2015 | Gu et al. |
| 2016/0054510 A1 | 2/2016 | Okimoto et al. |
| 2016/0320025 A1* | 11/2016 | Ebner ..................... F21V 5/00 |
| 2021/0088844 A1 | 3/2021 | Kasai |
| 2021/0341666 A1 | 11/2021 | Lu et al. |

FOREIGN PATENT DOCUMENTS

| | | |
|---|---|---|
| CN | 107505769 A | 12/2017 |
| JP | 2006302687 A | 11/2006 |
| JP | 2010080130 A | 4/2010 |
| JP | 2016045995 A | 4/2016 |
| JP | 2016192263 A | 11/2016 |
| KR | 1020060111997 A | 10/2006 |
| KR | 20120133153 A | 12/2012 |
| KR | 20150024959 A | 3/2015 |

OTHER PUBLICATIONS

Japanese Office Action dated Jul. 12, 2022 in corresponding Japanese Application No. 2018-245958.

\* cited by examiner

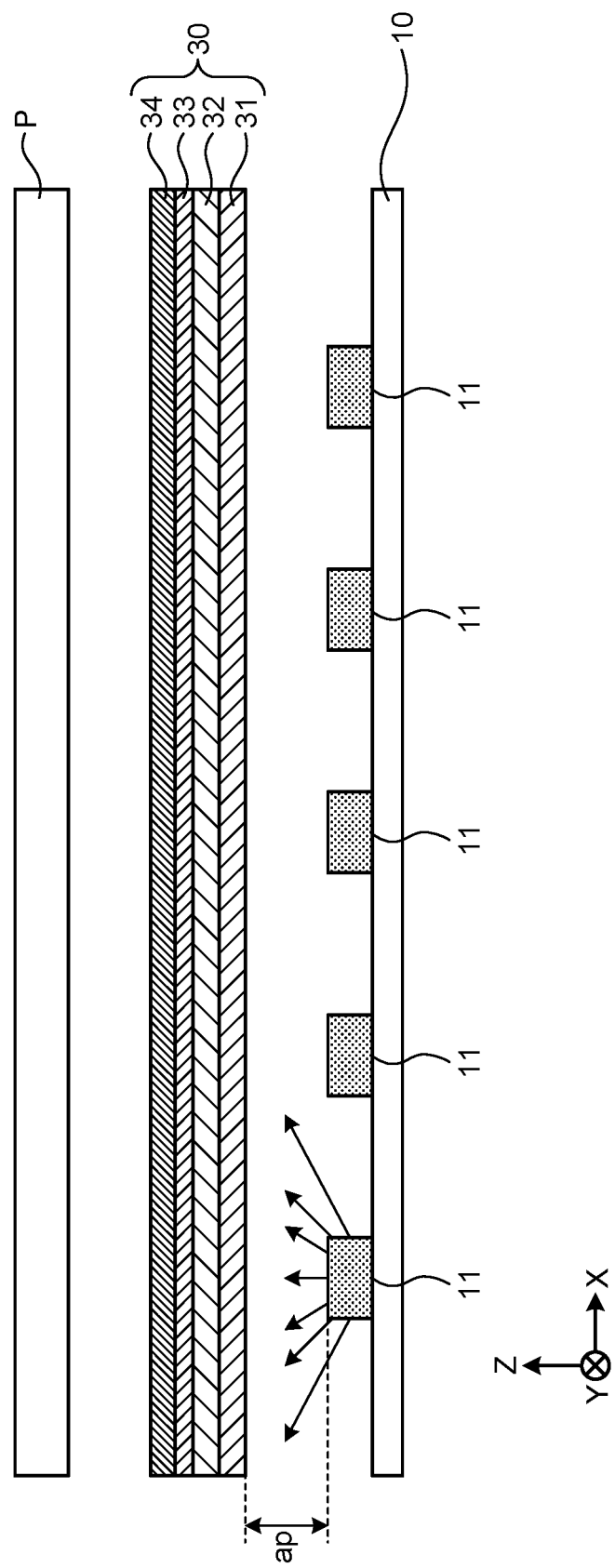

DISPLAY DEVICE, ILLUMINATION DEVICE, AND LIGHT GUIDING MEMBER

CROSS-REFERENCE TO RELATED APPLICATION

This application is a continuation of U.S. patent application Ser. No. 17/357,145, filed on Jun. 24, 2021, which application claims the benefit of priority from Japanese Patent Application No. 2018-245958 filed on Dec. 27, 2018 and International Patent Application No. PCT/JP2019/039399 filed on Oct. 4, 2019, the entire contents of which are incorporated herein by reference.

BACKGROUND

1. Technical Field

What is disclosed herein relates to a display device, an illumination device, a light guiding member, and a light guiding structure.

2. Description of the Related Art

As described in Japanese Patent Application Laid-open Publication No. 2016-192263, configurations in which a plurality of point light sources are arranged with predetermined intervals to illuminate a display panel from the rear surface side have been known.

When the point light sources like light emitting diodes (LEDs) are employed, luminance at positions directly above the LEDs is the highest and luminance at positions corresponding to intervals between the LEDs is relatively low.

For the foregoing reasons, there is a need for a display device, an illumination device, a light guiding member, and a light guiding structure capable of reducing lowering of luminance due to a distance from a light source.

SUMMARY

According to an aspect, a display device includes: a display panel configured to transmit light; and an illumination device provided on a rear surface side of the display panel. The illumination device includes a plurality of light sources configured to emit light, and a light guiding member that has translucency and is arranged between the light sources on the rear surface side of the display panel. The light guiding member has a plurality of holes each of which opens in a first direction intersecting with a rear surface of the display panel and in each of which a corresponding one of the light sources is disposed, and a light guiding portion surrounding the holes. A rear surface of the light guiding portion is provided with a first inclined surface inclined with respect to the first direction and a plane orthogonal to the first direction.

According to an aspect, an illumination device provided on a rear surface side of a liquid-crystal element, includes: a plurality of light sources; and a light guiding member that has translucency and is arranged between the light sources. The light guiding member has a plurality of through-holes in each of which a corresponding one of the light sources is disposed, and a light guiding portion surrounding the through-holes. A rear surface of the light guiding portion is provided with a first inclined surface inclined so as to be closer to a front surface of the light guiding portion as a distance from the light source is increased.

According to an aspect, a light guiding member includes: a light guiding portion that has translucency and is provided with a through-hole penetrating the light guiding portion in a first direction so as to house a light source. A rear surface of the light guiding portion is provided with a first inclined surface inclined so as to be closer to a front surface of the light guiding portion as a distance from the through-hole is increased.

BRIEF DESCRIPTION OF THE DRAWINGS

FIG. 15 is a view illustrating an example of the configuration of a display device that is different from the present disclosure.

DETAILED DESCRIPTION

Figure 1:
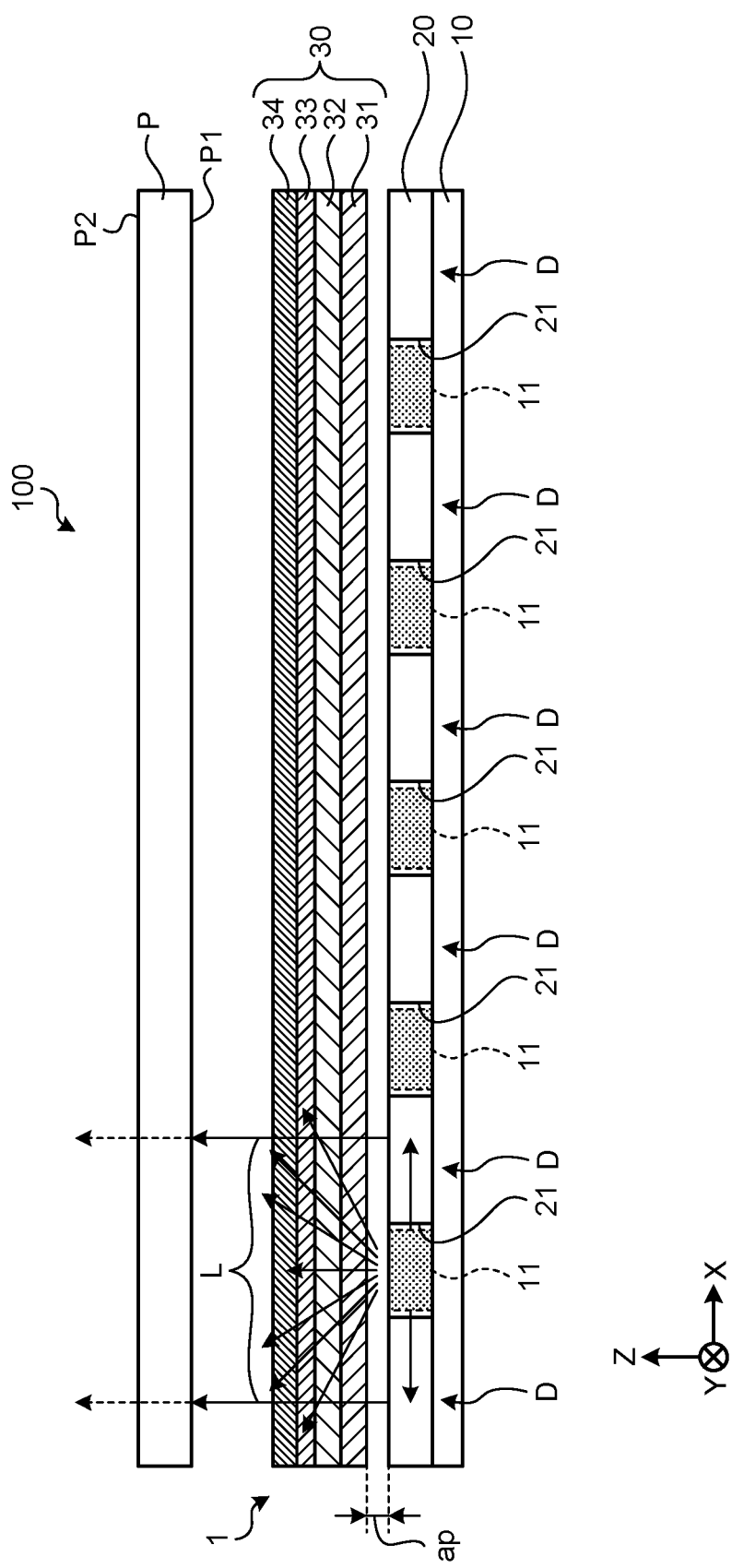
FIG. 1 is a schematic multilayered structural view illustrating the main configuration of a display device according to an embodiment.

Hereinafter, embodiments of the present disclosure will be described with reference to the drawings. The present disclosure herein is merely an example, and discretionary modifications within the gist of the disclosure at which those skilled in the art can easily arrive are naturally encompassed within the range of the present disclosure. In the drawings, widths, thicknesses, shapes, and the like of the components can be schematically illustrated in comparison with actual modes for more clear explanation. They are merely examples, however, and do not limit interpretation of the present disclosure. In the present specification and the drawings, the same reference numerals denote components similar to those described before with reference to the drawing that has been already referred, and detail explanation thereof can be omitted as appropriate.

In this disclosure, when an element is described as being "on" another element, the element can be directly on the other element, or there can be one or more elements between the element and the other element.

FIG. 1 is a schematic multilayered structural view illustrating the main configuration of a display device 100 according to an embodiment. The display device 100 includes a display panel P and an illumination device 1. The display panel P is a light transmissive display panel and displays images using transmitted light. Although light that schematically travels along a Z direction is denoted by a reference numeral L in FIG. 1, light from the illumination device 1 is not limited to light along the Z direction.

To be specific, the display panel P is illuminated from one surface (rear surface P1) side and displays images on the other surface (display surface P2) side. Although the display panel P is a transmissive liquid crystal display panel in which a plurality of pixels are arranged, for example, it may be a transflective liquid crystal display panel or a transmissive display panel using another system. The illumination device 1 is provided on the one surface side of the display panel P and illuminates the display panel P. In the following description, three directions orthogonal to one another are an X direction, a Y direction, and the Z direction. The illumination device 1 and the display panel P face each other in the Z direction. The display surface of the display panel P corresponds to an X-Y plane. The configuration in which these three directions are not orthogonal to one another can also be employed.

Figure 2:
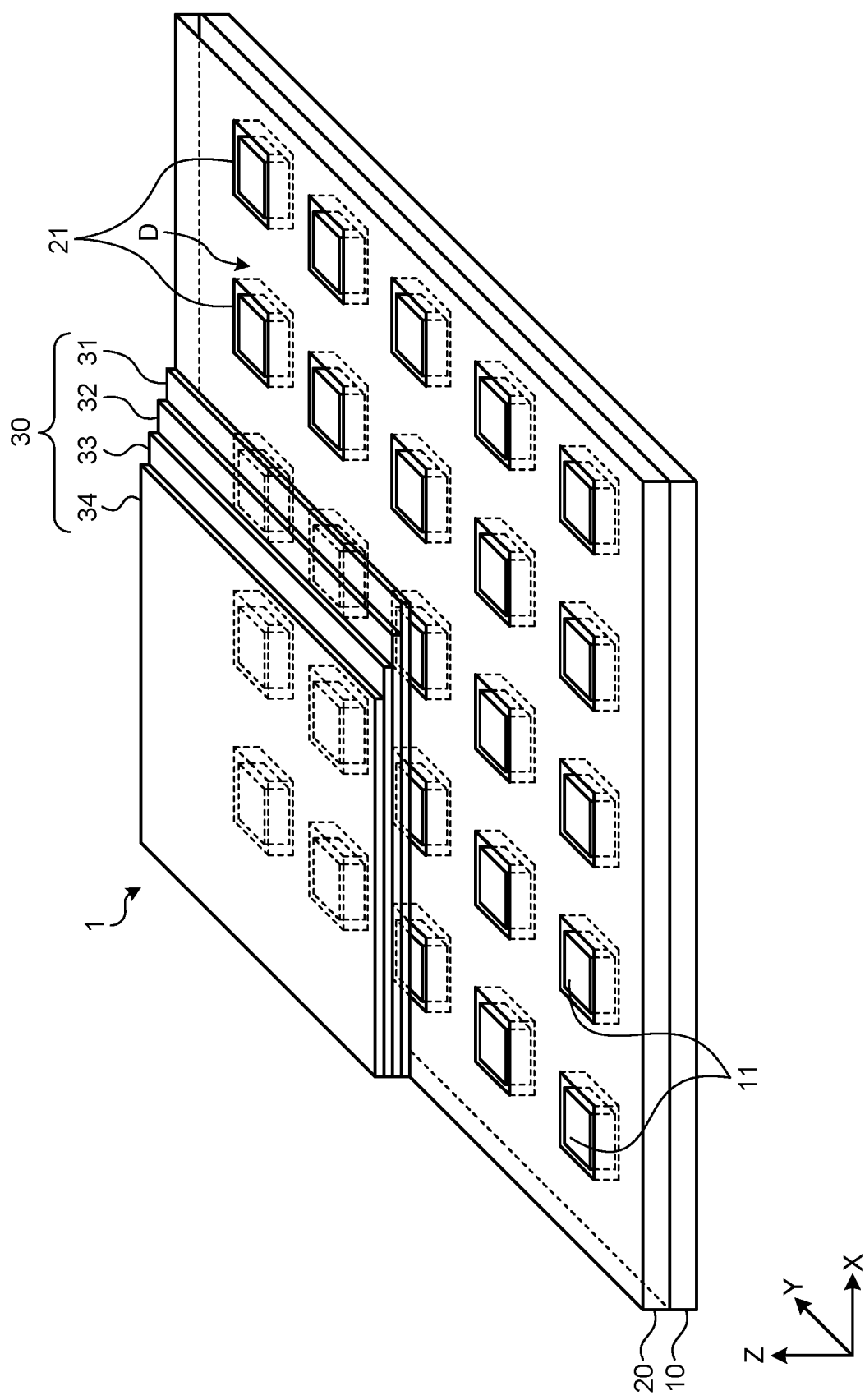
FIG. 2 is a schematic perspective view illustrating the main configuration of an illumination device when viewed from a surface side.

FIG. 2 is a schematic perspective view illustrating the main configuration of the illumination device 1 when viewed from the other surface side. FIG. 2 omits illustration related to a specific shape of a light guiding member 20, which will be described later with reference to FIG. 3 and other figures, in order to simply illustrate a positional relation of the light guiding member 20 relative to the other configurations such as a light source substrate 10 and light sources 11. FIG. 2 illustrates an optical sheet 30 such that the configuration of the optical sheet 30 is partially cut out in order to illustrate a positional relation between the light sources 11 and the light guiding member 20 when seen from the other surface side more clearly.

As illustrated in FIG. 1 and FIG. 2, the illumination device 1 includes the light source substrate 10, the light sources 11, the light guiding member 20, and the optical sheet 30. The light source substrate 10 is a substrate on which the light sources 11 are arranged and has wiring coupled to the light sources 11, and the like.

The light sources 11 are light emitting elements such as LEDs and emit light in accordance with supply of electric power. Electric power is supplied to the light sources 11 through the wiring of the light source substrate 10. A drive circuit (not illustrated) of the LEDs are coupled to the light source substrate 10. To be more specific, terminals are formed on the bottom surfaces of the light sources 11 and are coupled to the wiring of the light source substrate 10. The light sources 11 can be individually turned on and off under control of the drive circuit. Brightness thereof when they are on can also be individually adjusted.

As illustrated in FIG. 2, the light sources 11 are arranged in a matrix with a row-column configuration that extends in the X direction and the Y direction along the X-Y plane. FIG. 2 illustrates an example in which 5×5 light sources 11 including five light sources 11 aligned in the X direction and five light sources 11 aligned in the Y direction, are arranged in a matrix; however, the number and arrangement of light sources 11 are desirably set. The arrangement of the light sources 11 is not limited to the above-mentioned matrix form; and various arrangement forms including a zigzag arrangement, a radial arrangement, and an arrangement obtained by omitting a part of any of these arrangement forms can be employed.

As schematically indicated by arrows from the light source 11 in FIG. 1, the light sources 11 emit light radially. To be more specific, light from the light sources 11 is output not only from the upper surfaces of the light sources 11 but also from the side surfaces thereof. That is to say, most of the light beams from the light sources 11 have not only a component in the Z direction but also components in the X direction and the Y direction. Accordingly, light from the light sources 11 includes light in the direction along the X-Y plane without being limited to light in the Z direction.

The light guiding member 20 has a plurality of holes (through-holes) 21 with predetermined intervals and a light guiding portion D surrounding the holes 21. The light guiding member 20 is arranged stacking on the light source substrate 10, so that the light sources 11 are housed in the holes 21.

Although the light guiding member 20 is made of synthetic resin or glass having translucency, the specific material thereof can be changed as appropriate as long as the light guiding member 20 is a translucent member that reflects or transmits light depending on the angle of a surface thereof with respect to light. That is to say, the refractive index, reflectivity, and light diffusibility of the light guiding member 20 can be changed as appropriate. The light guiding member 20 guides light from the light sources 11 to the display panel P side. Specific influences on light from the light sources 11 by the light guiding member 20 will be described later.

The optical sheet 30 diffuses light emitted from the light sources 11. The optical sheet 30 illustrated in FIG. 2 is configured by stacking four optical sheets 31, 32, 33, and 34 having different optical characteristics but is not limited thereto. The optical sheet 30 may be an optical sheet of a single layer or an optical sheet having a multilayered structure of two layers, three layers, or five or more layers.

Figure 3:
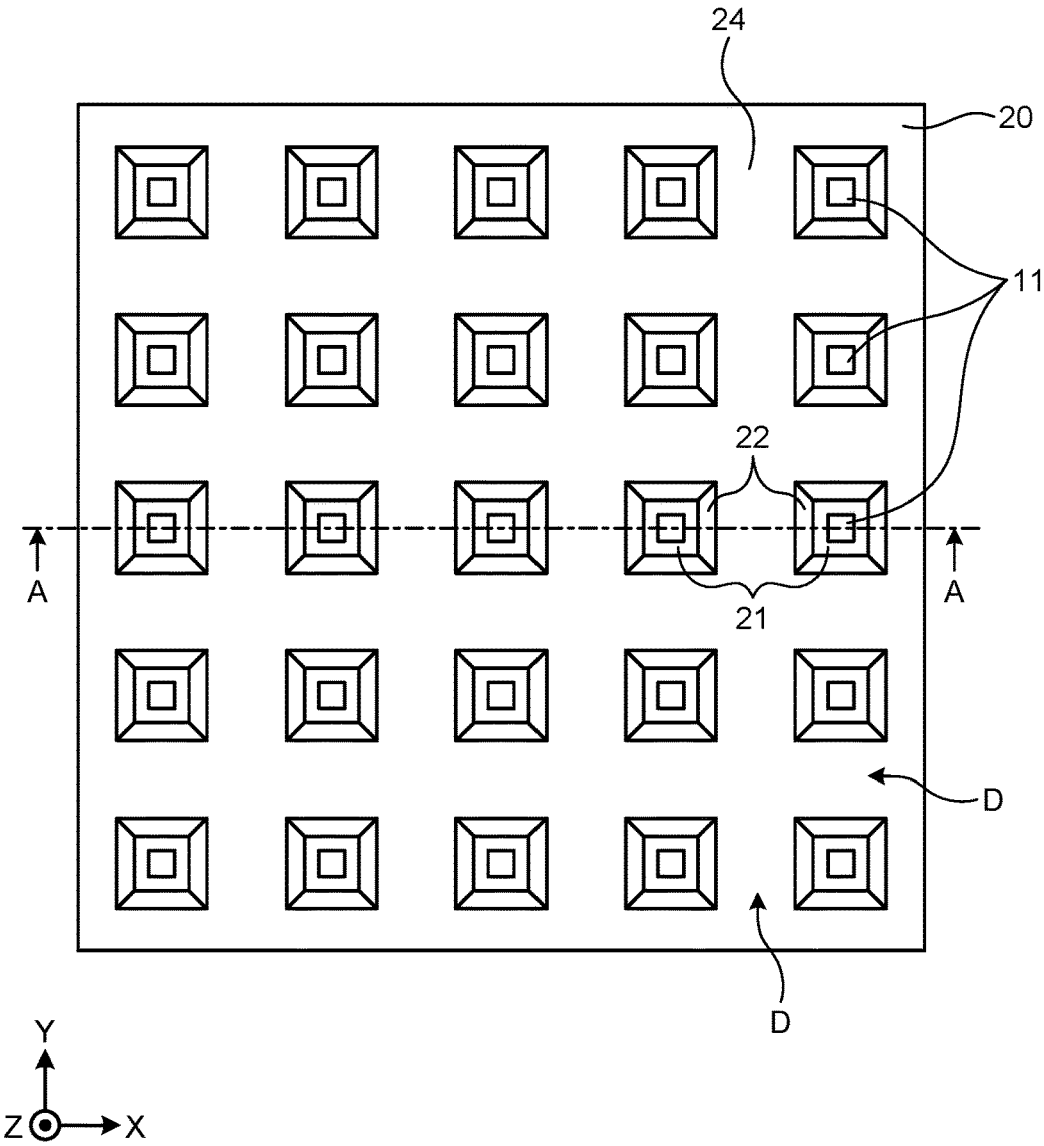
FIG. 3 is an X-Y plan view illustrating a relation between light sources and a light guiding member.
Figure 4:
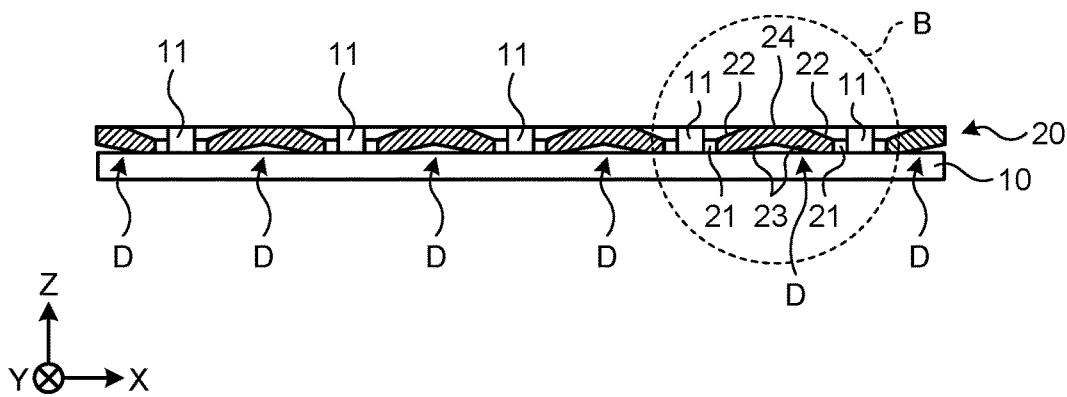
FIG. 4 is a cross-sectional view cut along line A-A in FIG. 3.

FIG. 3 is an X-Y plan view illustrating a relation between the light sources 11 and the light guiding member 20. FIG. 4 is a cross-sectional view cut along line A-A in FIG. 3. The light guiding member 20 has the holes 21 provided with the predetermined intervals and the light guiding portion D provided so as to surround the holes 21. The light guiding portion D has second inclined surfaces 22, first inclined surfaces 23, and facing surfaces 24. The second inclined surfaces 22 form a part of the wall surfaces of the holes 21. The light guiding member 20 is made with a plate material having translucency, and a plane including the facing surfaces 24 can be referred to as an output surface and a plane including a surface that is in contact with the light source substrate 10 can be referred to as a rear surface.

Figure 5:
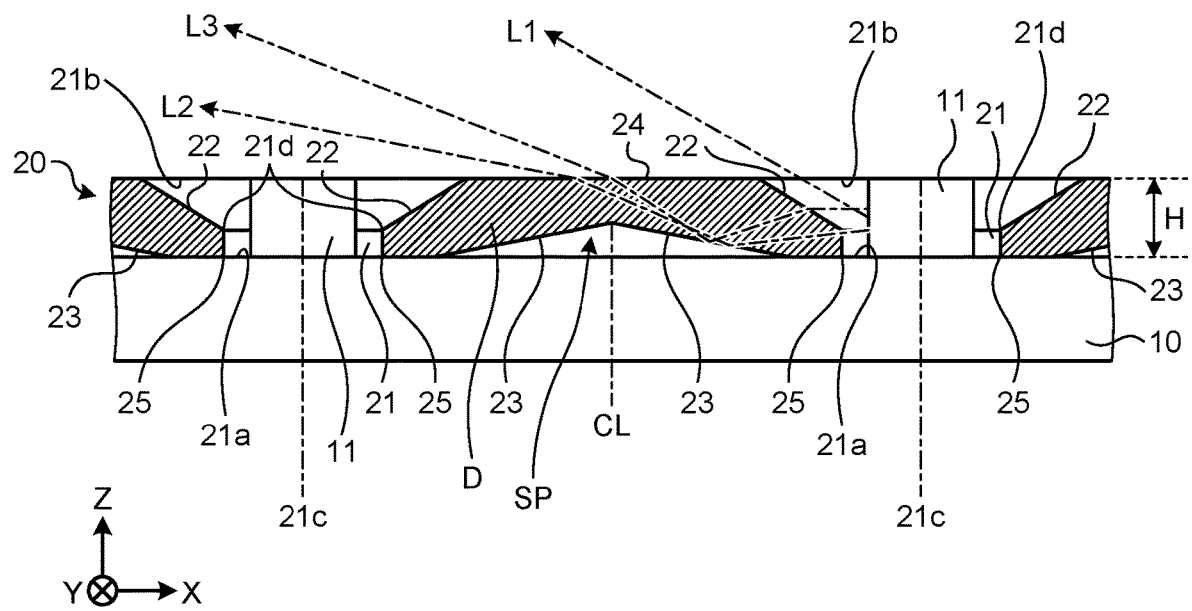
FIG. 5 is an enlarged cross-sectional view illustrating a configuration within a portion B in FIG. 4.

FIG. 5 is an enlarged cross-sectional view illustrating a configuration within a portion B in FIG. 4. The holes 21 penetrate from the surface (rear surface) of the light guiding member 20 on the light source substrate 10 side to the surface (output surface) thereof on the display panel P side. Light emitted from the light sources 11 in the Z direction passes through the optical sheet 30 and illuminates the display panel P.

To be more specific, the holes 21 have first openings 21a on the rear surface side and second openings 21b on the output surface side, and both of them have rectangular shapes in the X-Y plane. In the embodiment, the light sources 11 have rectangular shapes in the X-Y plane and have dimensions of 1 [mm] in the X direction and the Y direction. Dimensions of the first openings 21a in the X direction and the Y direction are 1.6 [mm]. Each of the light sources 11 is ideally arranged at the center of the hole 21 in an X-Y plane viewpoint but is not necessarily arranged at the center strictly. It is sufficient that the light source 11 is arranged in the hole 21. The above-mentioned numerical values are illustrative examples and can be changed as appropriate. The light guiding member 20 thus has a light guiding structure provided with the holes 21 that open in the first direction (Z direction) and in which the light sources 11 are arranged.

The second inclined surfaces 22 are provided on the output surface side of the light guiding member 20. The second inclined surfaces 22 are inclined with respect to the Z direction and the X-Y plane. To be specific, the second inclined surface 22 is an inner wall surface of the hole 21 extending continuously from an intermediate portion 21d of the hole 21, which serves as a base end, in the direction away from the center line 21c of the hole as a distance from the output surface is decreased. The second inclined surface 22 causes a part of light emitted from the light source 11 to be output without being influenced by at least one of reflection and refraction by the light guiding member 20, that is, without passing through the light guiding member 20. Such light contains a large component in the Z direction and is output toward the display panel P with sufficient luminance without needing the guidance by the light guiding member 20. Each of the intermediate portion 21d as the base end portion of the second inclined surface 22 is preferably provided on the rear surface side with respect to the center of the light guiding member 20 in the thickness direction. The intermediate portion 21d is preferably provided on the rear surface side with respect to the output surface of the light source 11 housed in the hole 21, and more preferably provided on the rear surface side with respect to a position corresponding to the half of the height of the light source 11 from the light source substrate 10.

The first inclined surfaces 23 are provided on the rear surface side of the light guiding member 20. The first inclined surfaces 23 are inclined with respect to the Z direction and the X-Y plane. To be specific, the first inclined surface 23 extends continuously from an opening edge 25 of the first opening 21a of the hole 21, which serves as a base end, in the direction away from the center line 21c of the hole 21 as a distance from the output surface is decreased. Inclination of the first inclined surface 23 extends continuously from the opening edge 25 serving as the base end to a termination end CL farthest from the light source 11 in a desired direction along the X-Y plane. The position of the termination end CL is located on, for example, an intermediate line between two adjacent holes 21. The distances from the center lines 21c of the two adjacent holes 21 to the intermediate line are equal. A Space SP is formed between the two adjacent holes 21. Roof portions of the space SP are two first inclined surfaces 23 that are symmetrically continuous with respect to the above-mentioned intermediate line as the boundaries. As described above, the light guiding member 20 has a light guiding structure in which the first inclined surfaces 23 inclined with respect to the Z direction and the X-Y plane are formed.

An arrangement pitch of the light sources 11 in each of the X direction and the Y direction is 6 [mm] in the embodiment. A pitch of the holes 21 of the light guiding member 20 is also 6 mm. Thus, a distance from the center of a certain hole 21 to the termination end CL in the X direction (Y direction) is 3 [mm]; however, the distance is merely examples and can be changed as appropriate.

As illustrated in FIG. 5, the light guiding member 20 has a configuration that is symmetric between the two adjacent light sources 11 with the termination ends CL interposed therebetween.

As illustrated in FIG. 5, light L2 and light L3 that have entered the inner circumferential surface of the hole 21 along the X-Y plane, more specifically, parts of light output from the light source 11 that have larger X-Y components than a Z-direction component or that contain negative components in the Z direction are refracted and incident from the second inclined surface 22 toward the inside of the light guiding member 20 and then travel to the side of the first inclined surface 23. The light L2 and the light L3 are reflected to the display panel P side by the first inclined surface 23 and thereby travel to the display panel P side at farther positions from the light source in comparison with output angles from the light source 11. The first inclined surface 23 and the second inclined surface 22 have different inclination angles with respect to the X-Y plane. The first inclined surface 23 has a more acute inclination angle with respect to the X-Y plane than that of the second inclined surface 22.

The inclination angle of the first inclination surfaces 23, the inclination angle of the second inclined surfaces 22, and positions of origin points thereof are desirably adjusted such that light output along the X-Y plane in light emitted from the light sources 11 is made easier to travel to the display panel P side.

Each of the facing surfaces 24 is provided on the output surface side of the light guiding portion D. The facing surface 24 is along the X-Y plane and faces the optical sheet 30. The facing surface 24 is a surface from which light passing through the inside of the light guiding portion D is output, as indicated by the light L2 and the light L3 in FIG. 5. The output angles of the light L2 and the light L3 are slightly increased by refraction occurred in the facing surface 24.

The surfaces of the light sources 11 and the light guiding member 20 that face the optical sheet 30 are flush with each other along the X-Y plane in the embodiment. To be specific, a thickness H of the light guiding member 20 corresponds to the height of the light sources 11 from the light source substrate 10, as illustrated in FIG. 5. In other words, the upper surfaces of the light sources 11 and the output surface of the light guiding member 20 match with each other. Positions of the facing surfaces 24 in the Z direction with respect to the light source substrate 10 are the same as the positions of the upper surfaces of the light sources 11, and the light source substrate 10 serve as bottom portions of the light sources 11. A configuration in which the upper surfaces of the light sources 11 and the output surface of the light guiding member 20 are not flush with each other can also be employed. For example, a configuration in which the upper surfaces of the light sources 11 are closer to the light source substrate 10 than the output surface of the light guiding member 20 is, can also be employed. In this case, the upper surfaces (top portions) of the light sources 11 are located in the respective holes 21.

Although the thickness H of the light guiding member 20 is 0.8 [mm] in the embodiment, this is merely an example and can be changed as appropriate.

Hereinabove, according to the embodiment, as in the case of the light L2 and the light L3 described with reference to FIG. 5, light from the light source 11 can be made to travel to the display panel P side more efficiently by reflection of the light L2 and the light L3 by the first inclined surface 23 in the light guiding portion D. When light passes through the inside of the light guiding member 20 without being output directly from the vicinity of the light source 11 not through the light guiding portion like the light L2 and the light L3, the light can be diffused to farther positions from the light source 11 in the X-Y plane viewpoint. Consequently, luminance unevenness in the X-Y plane viewpoint that would be caused depending on the distances from the light sources 11 can be reduced.

When the light guiding portion D is not interposed in a light path by presence of the second inclined surface 22 as in the case of the light L1 described with reference to FIG. 5, light traveling toward the display panel P side without reflection can be made to travel toward the display panel P side as it is.

The light guiding portion D is provided so as to surround the light sources 11. The thickness of the light guiding member 20 is thereby reduced to the thickness H corresponding to the thickness of the light sources 11. To be more specific, the light guiding portion D is not provided directly above nor around the light sources 11, and light from the light sources 11 that has a larger component in the Z direction than the components in the X direction and the Y direction is output to the display panel P side without passing through the light guiding portion D. The thickness H of the light guiding member 20 is therefore reduced to the thickness of the light sources 11, thereby providing a thinner illumination device 1, eventually a thinner display device 100.

If no light guiding member 20 is provided, as illustrated in FIG. 15, a large gap ap (for example, having a size of equal to or greater than the height of the light sources 11) for light diffusion needs to be provided between the light sources 11 and the optical sheet 30 in order to diffuse light from the light sources 11, that is, sufficiently reduce luminance unevenness between the light sources. The gap ap increases the thickness of the entire display device, which makes it more difficult to reduce the thickness thereof. By contrast, according to the embodiment, the gap ap can be reduced (for example, to a gap equal to or smaller than the height of the light sources 11) in comparison with a case in which no light guiding member 20 is provided, as illustrated in FIG. 1, thereby providing the thinner display device 100.

Although the gap ap may be 0 or a value larger than 0, it can be set to be equal to or smaller than 1 [mm] even when the pitch of the light sources 11 in the embodiment is taken into consideration.

Modifications

Hereinafter, modifications of the embodiment will be described with reference to FIG. 6 to FIG. 11. In explanation of the modifications, the same reference signs denote similar components to those in the embodiment, and duplicate explanation thereof is omitted.

First Modification

Figure 6:
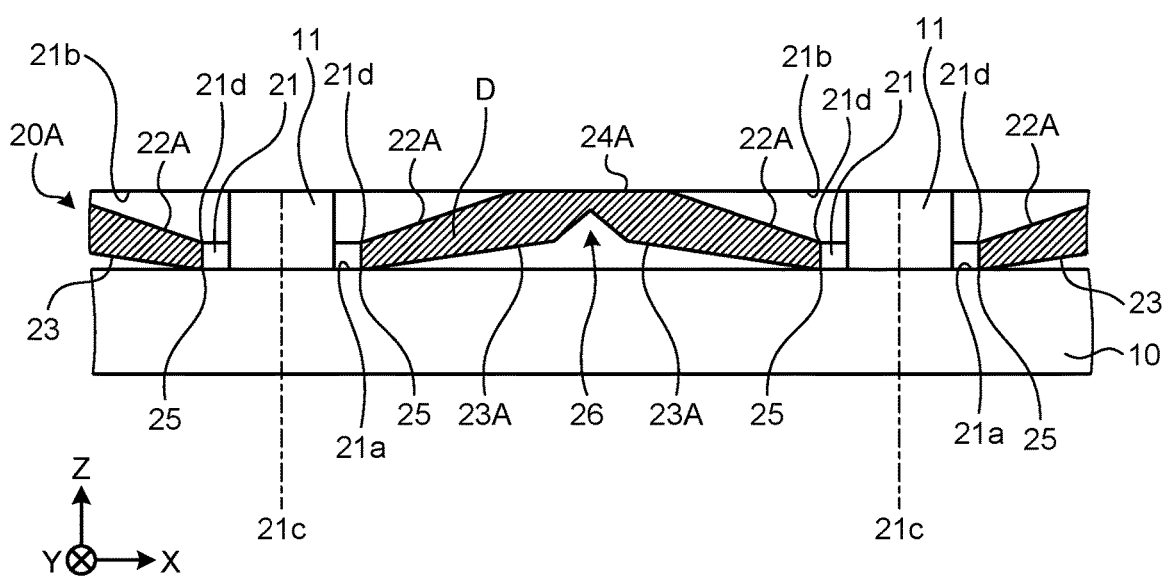
FIG. 6 is an enlarged cross-sectional view illustrating a characteristic configuration in a first modification.

FIG. 6 is an enlarged cross-sectional view illustrating a characteristic configuration in a first modification. FIG. 6 and FIG. 7 to FIG. 9, which will be described later, are cross-sectional views illustrating a configuration within the portion B in FIG. 4 in description of the embodiment in an enlarged manner.

Inclined surfaces provided on the rear surface side of a light guiding member 20A in the first modification include a plurality of slopes (slopes 23A and grooves 26) that are different in positions with respect to the light sources 11 and different in angles with respect to the X-Y plane. To be specific, the light guiding member 20A in the first modification includes the slopes 23A provided instead of the first inclined surfaces 23 in the embodiment and the grooves 26 provided at intermediate positions between the slopes 23A adjacent to each other in the arrangement direction of the holes 21. The slope 23A and the groove 26 have different inclination angles with respect to the X-Y plane. In the example illustrated in FIG. 6, the groove 26 has a larger angle with respect to the X-Y plane than that of the slope 23A and is provided behind facing surface 24A. More light can thereby be output from the facing surfaces 24A.

Although the slopes 23A illustrated in FIG. 6 and FIG. 7 to FIG. 9, which will be described later, have a smaller inclination angle with respect to the X-Y plane than that of the first inclined surfaces 23, they are merely an example and are not limited thereto. The inclination angle of the slopes 23A with respect to the X-Y plane may be similar to that of the first inclined surfaces 23 or may be larger than that of the first inclined surfaces 23.

Slopes 22A illustrated in FIG. 6 and FIG. 7 to FIG. 9, which will be described later, are provided instead of the second inclined surfaces 22 in the embodiment. Although the slopes 22A have a smaller inclination angle with respect to the X-Y plane than that of the second inclined surfaces 22, they are merely an example and are not limited thereto. The inclination angle of the slopes 22A with respect to the X-Y plane may be similar to that of the second inclined surfaces 22 or may be larger than that of the second inclined surfaces 22. With the above-mentioned inclination angle, the facing surfaces 24A, 24B, 24C, and 24D illustrated in FIG. 6 and FIG. 7 to FIG. 9, which will be described later, have a smaller width in the X direction than that of the facing surfaces 24; however, they are merely an example and are not limited thereto. The width of each of the facing surfaces 24A, 24B, 24C, and 24D depends on the inclination angle of the slopes 22A with respect to the X-Y plane. The grooves 26 have a larger angle with respect to the X-Y plane than that of the slopes 22A.

Second Modification

Figure 7:
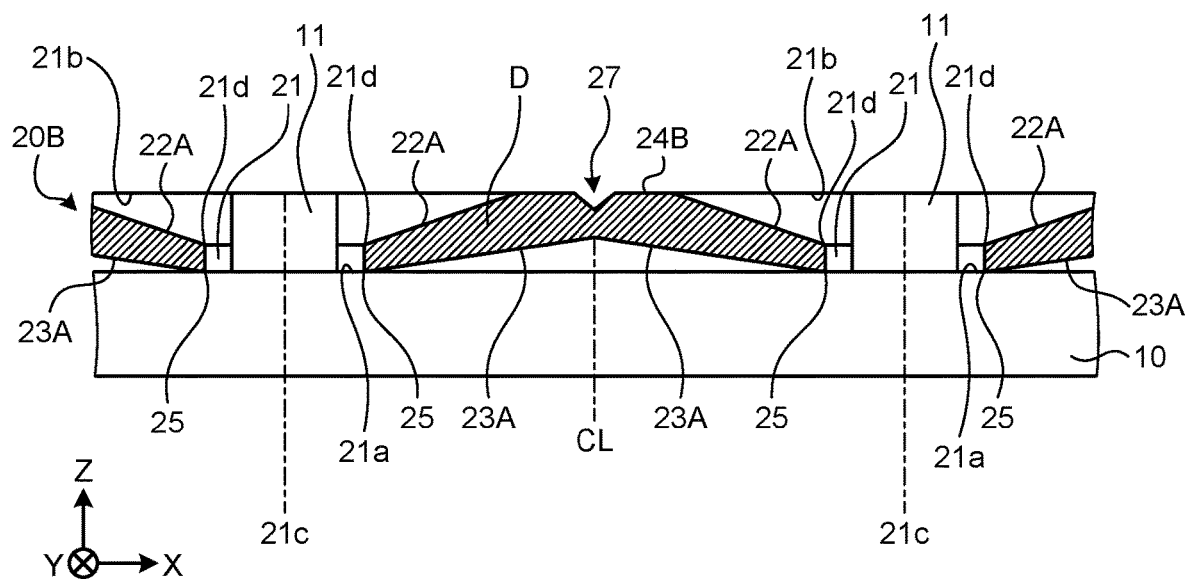
FIG. 7 is an enlarged cross-sectional view illustrating a characteristic configuration in a second modification.

FIG. 7 is an enlarged cross-sectional view illustrating a characteristic configuration in a second modification. In second and subsequent modifications, difference from the first modification described with reference to FIG. 6 is explained, the same reference signs denote similar components, and duplicate explanation thereof is omitted.

In the second modification and third and fourth modifications, which will be described later, the slopes 22A and a plurality of slopes that are different in positions with respect to the light sources 11 and different in angles with respect to the X-Y plane, are provided on the output surface side of a light guiding member. To be specific, a light guiding member 20B in the second modification has, in addition to the slopes 22A, a groove 27 in a facing surface 24B.

Each of the grooves 27 has inclined surfaces each of which becomes closer to the first inclined surface 23 from the facing surface 24B as it becomes closer to the termination end CL from the side close to the hole 21. The slopes 22A and the grooves 27 thus have different inclination angles with respect to the X-Y plane.

Third Modification

Figure 8:
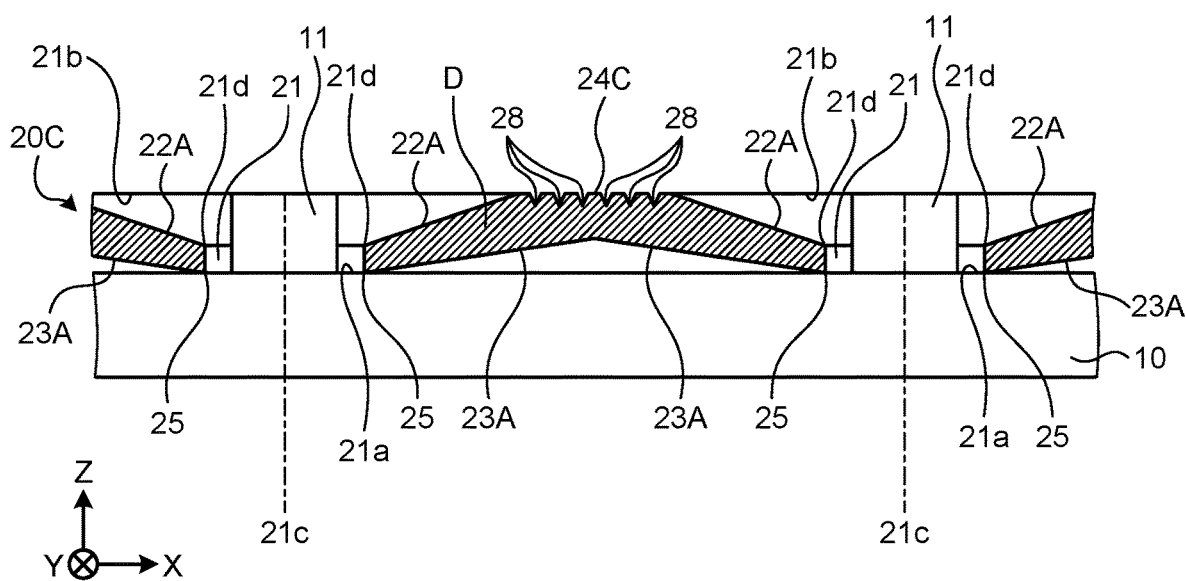
FIG. 8 is an enlarged cross-sectional view illustrating a characteristic configuration in a third modification.

FIG. 8 is an enlarged cross-sectional view illustrating a characteristic configuration in a third modification. A light guiding member 20C in the third modification has, in addition to the slopes 22A, a plurality of grooves 28 in a facing surface 24C. Each groove 28 is shallower than the groove 27 but may be the same as or deeper than the groove 27. The configuration in which each groove 28 becomes deeper from the outermost side toward the inner side can also be employed.

Fourth Modification

Figure 9:
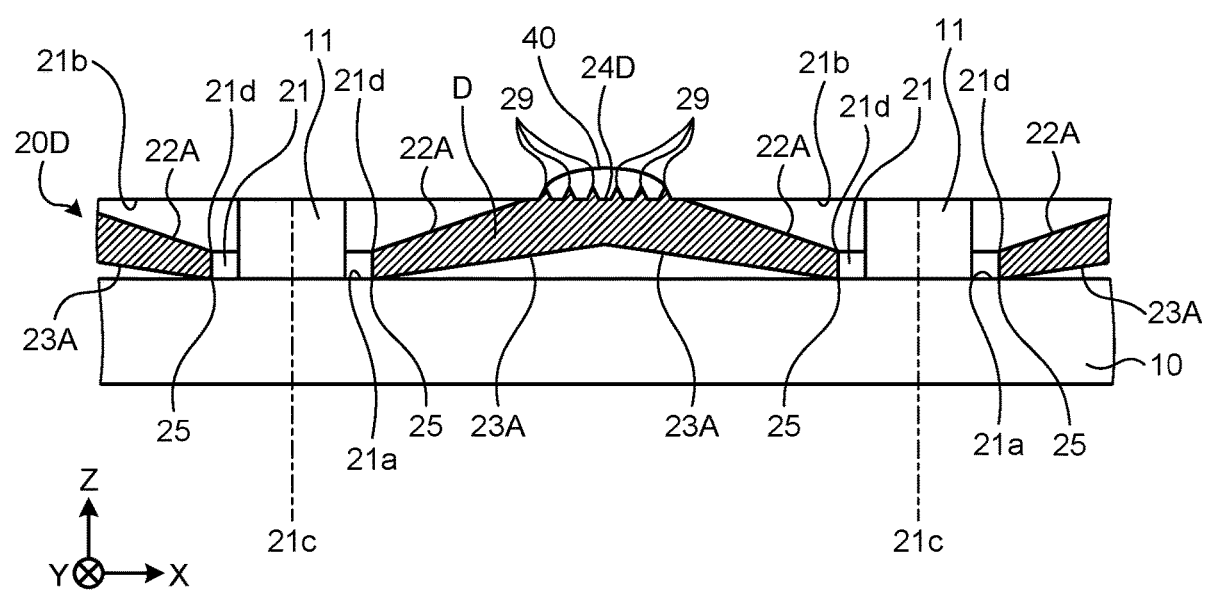
FIG. 9 is an enlarged cross-sectional view illustrating a characteristic configuration in a fourth modification.

FIG. 9 is an enlarged cross-sectional view illustrating a characteristic configuration in a fourth modification. A light guiding member 20D in the fourth modification has, in addition to the slopes 22A, a plurality of projecting portions 29 projecting toward the display panel P side from a facing surface 24D.

Figure 10:
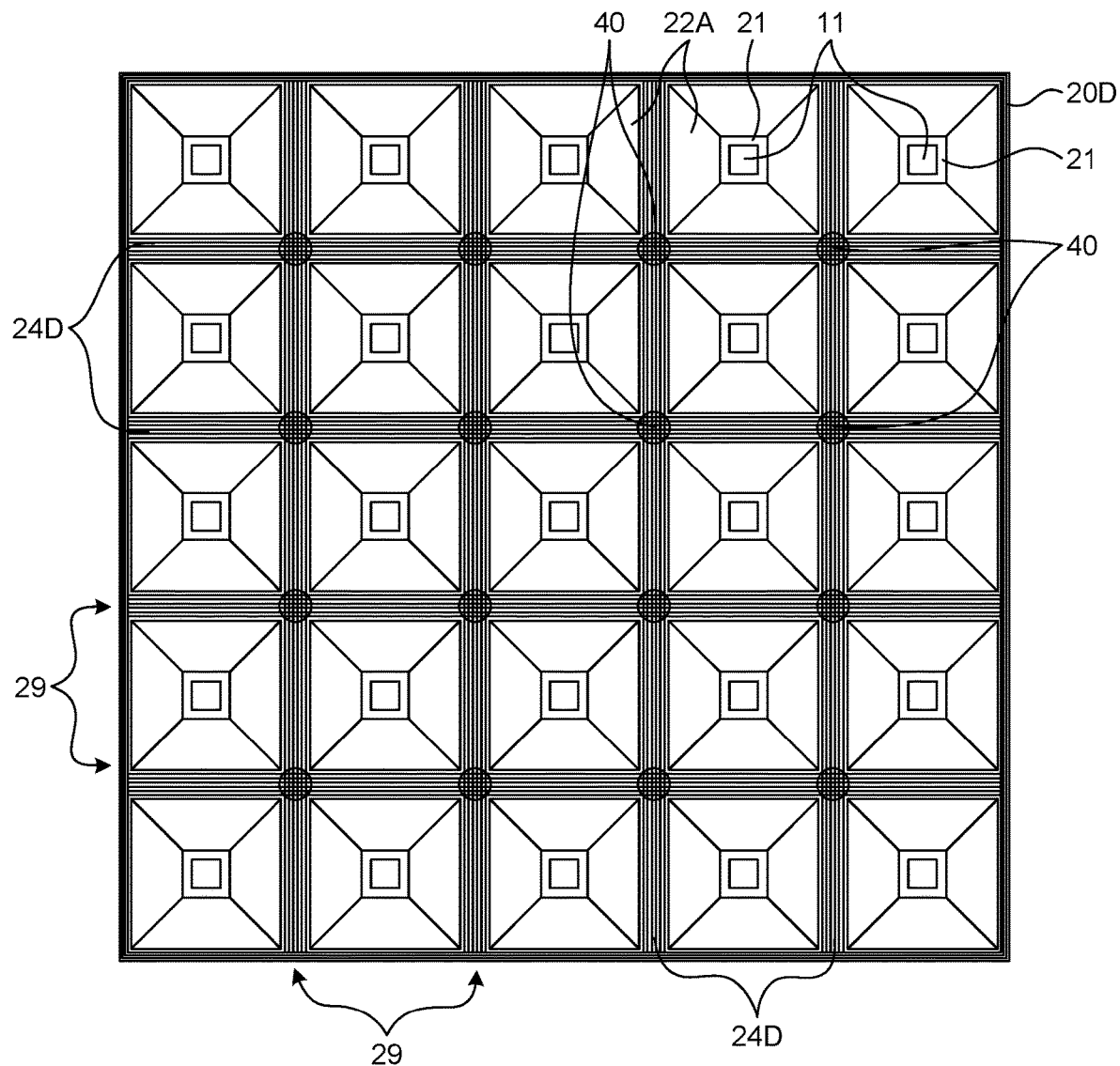
FIG. 10 is an X-Y plan view illustrating a relation between the light sources and a light guiding member in the fourth modification.

FIG. 10 is an X-Y plan view illustrating a relation between the light sources 11 and the light guiding member 20D in the fourth modification. The projecting portions 29 are provided along the Y direction on the facing surfaces 24D between the light sources 11 aligned in the X direction. More than one projecting portion 29 is provided on each facing surface 24D. The projecting portions 29 along the Y direction are aligned in the X direction. The projecting portions 29 are provided along the X direction on the facing surfaces 24D between the light sources 11 aligned in the X direction. More than one projecting portion 29 is provided on each facing surface 24D. The projecting portions 29 along the X direction are aligned in the Y direction.

A cross-sectional shape of each projecting portion 29 is an isosceles triangular shape having an apex on the display panel P side, as illustrated in FIG. 9. An angle of the inclined surfaces of the projecting portion 29 with respect to the X-Y direction is larger than those of the slopes 22A and 23A. This configuration can increase output light from the facing surfaces 24D.

Covering members 40 are provided at positions at which the projecting portions 29 along the X direction and the projecting portions 29 along the Y direction intersect with each other. The covering members 40 are made to adhere to and are fixed to the light guiding member 20D on the display panel P side so as to cover top portions of the projecting portions 29 on the display panel P side. The covering members 40 are, for example, colorless covers made of resin having translucency but are not limited thereto, and a specific material thereof can be changed as appropriate.

In the fourth modification, the optical sheet 30 is stacked on the display panel P side of the light guiding member 20D on which the covering members 40 are provided. With this configuration, influences on optical characteristics of the optical sheet 31 due to physical contact of the projecting portions 29 can be prevented.

The number of grooves 28 illustrated in FIG. 8 and the number of projecting portions 29 illustrated in FIG. 9 that are formed between the two adjacent light sources 11 are six; however, they are merely an example and are not limited thereto. The number of grooves 28 and the number of projecting portions 29 between the two adjacent light sources 11 can be changed as appropriate. The angles, sizes, numbers of the grooves 28 and projecting portions 29 can be changed as appropriate.

Fifth Modification

Figure 11:
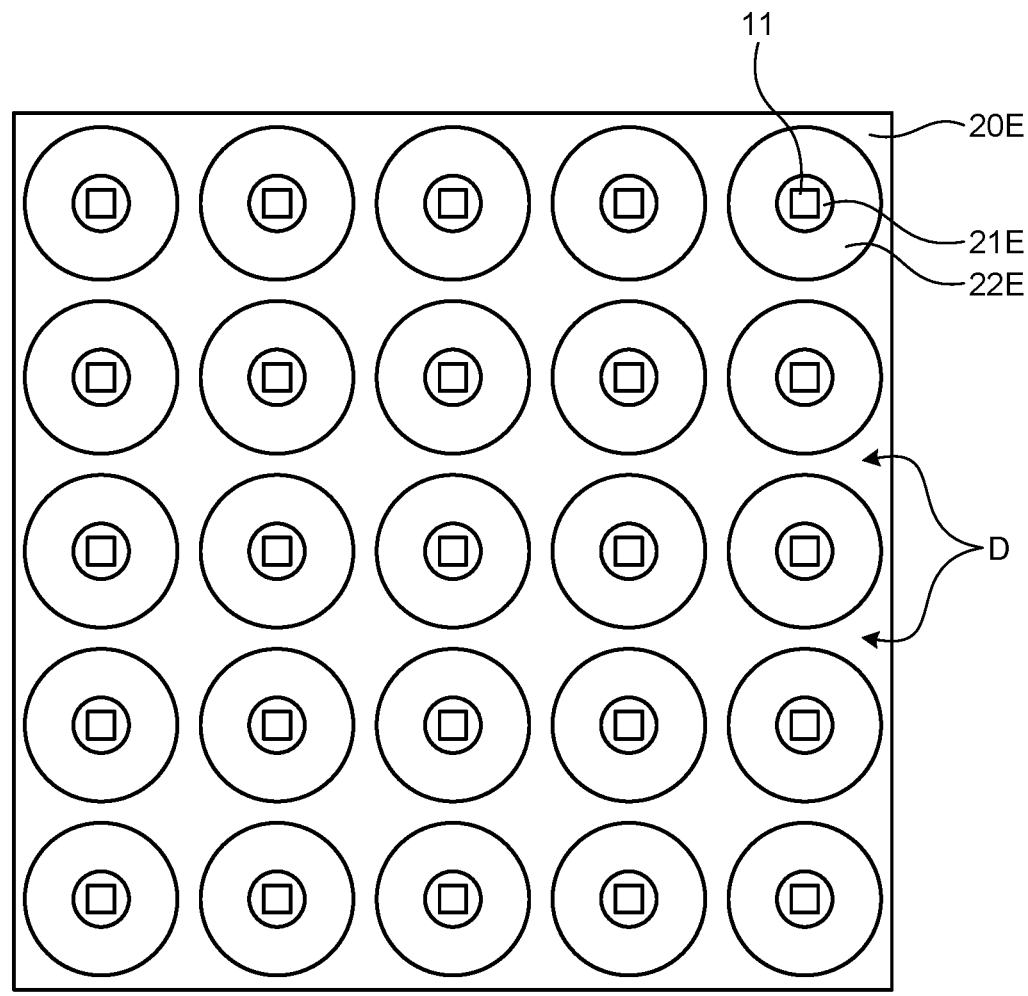
FIG. 11 is an X-Y plan view illustrating a relation between the light sources and a light guiding member in a fifth modification.

FIG. 11 is an X-Y plan view illustrating a relation between the light sources 11 and a light guiding member 20E in a fifth modification. The first openings 21a and the second openings 21b of the holes 21 are formed into circular shapes in this modification. With these shapes, the inclined surfaces are formed into mortar shapes.

Figure 12:
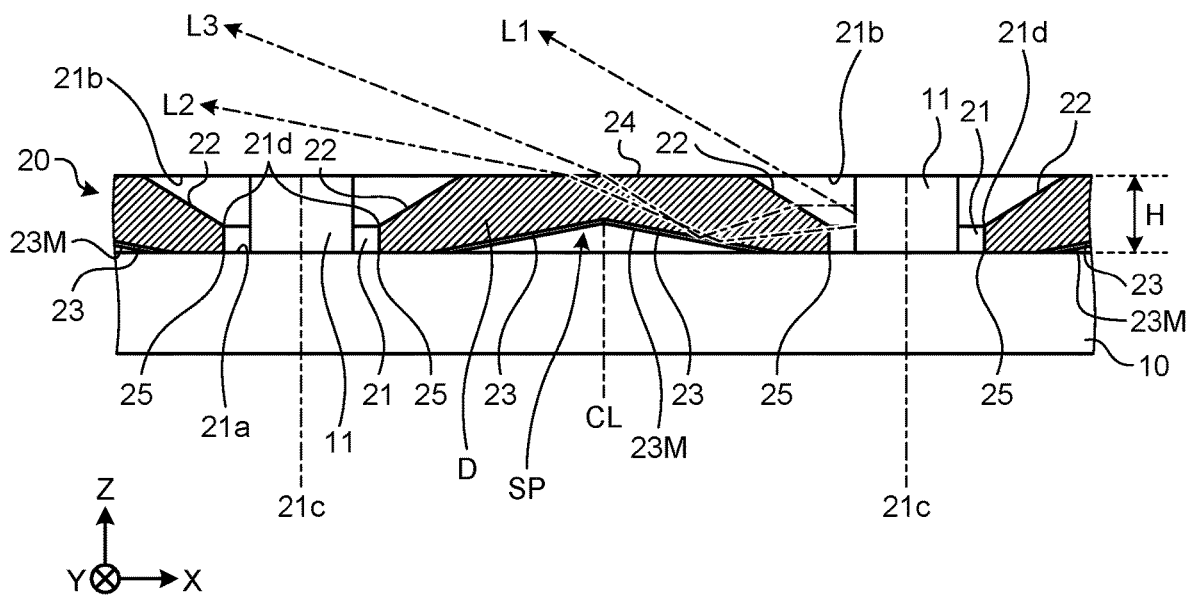
FIG. 12 is a diagram illustrating an example of the configuration on which mirror finishing has been performed.

FIG. 12 is a diagram illustrating an example of the configuration on which mirror finishing has been performed. The mirror finishing for more reliable reflection of light to the display panel P side may be performed on the first inclined surfaces 23 (or the slopes 23A and the grooves 26) on the light source substrate 10 side. FIG. 12 illustrates mirror-finished portions 23M that are further provided on the light source substrate 10 side of the first inclined surfaces 23 of the configuration illustrated in FIG. 5; however, the configuration is not limited thereto, and a configuration similar to the mirror-finished portions 23M may be provided also on the light source substrate 10 side of the slopes 23A and the grooves 26. The mirror-finished portions 23M are provided by forming thin films made of metal, alloy, or compound such as an oxide by working processing such as vapor deposition to cause the thin films to function as mirror surfaces, for example. A specific formation method of the mirror-finished portions 23M is not limited thereto and can be changed as appropriate. For example, mirror sheets may be attached.

Figure 13:
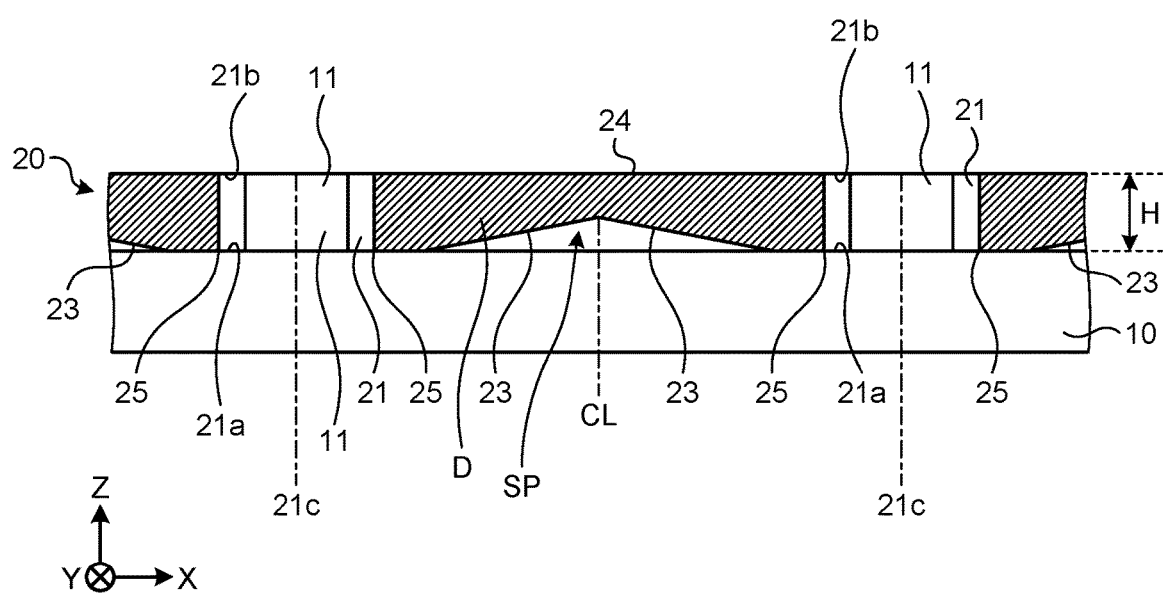
FIG. 13 is a diagram illustrating an example of the configuration of a light guiding member in which second inclined surfaces are omitted.

FIG. 13 and FIG. 4 are diagrams each of which illustrates an example of the configuration of the light guiding member 20 in which the second inclined surfaces 22 are omitted. The second inclined surfaces 22 described with reference to FIG. 5 and other figures are not essential. As illustrated in FIG. 13, for example, the configuration provided by omitting the second inclined surfaces 22 from the light guiding member 20 in FIG. 5 may be employed.

Figure 14:
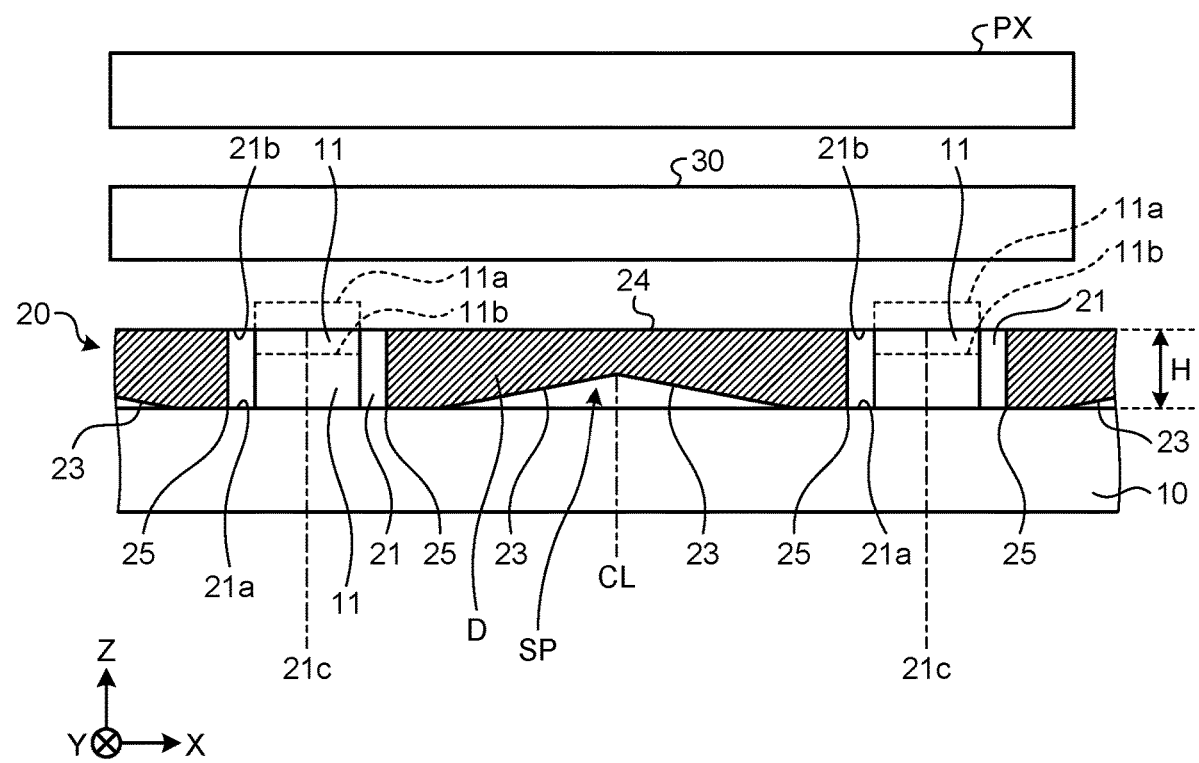
FIG. 14 is a diagram illustrating an example of the configuration of a light guiding member in which second inclined surfaces are omitted.

In the example illustrated in FIG. 13, the positions of the facing surfaces 24 in the Z direction with respect to the light source substrate 10 are the same positions as the upper surfaces of the light sources 11. The light source substrate 10 serve as the bottom portions of the light sources 11. A configuration in which the upper surfaces of the light sources 11 and the output surface of the light guiding member 20 are not flush with each other can also be employed. For example, as illustrated in FIG. 14, a configuration in which the upper surfaces (output surfaces) of the light sources 11 are closer to or farther from the light source substrate 10 than the output surface of the light guiding member 20 is, can also be employed. FIG. 14 illustrates output surfaces 11b as the upper surfaces the light sources 11 at the positions closer to the light source substrate 10. In this case, the upper surfaces (top portions) of the light sources 11 are located in the respective holes 21. FIG. 14 also illustrates output surfaces 11a as the upper surfaces of the light sources 11 at the positions farther from the light source substrate 10. In this case, the upper surfaces (top portions) of the light sources 11 are located outside the respective holes 21. For example, the illumination device illustrated in FIG. 14 is provided facing a liquid-crystal optical element PX having a lens function of diffusing and concentrating light passing therethrough. Obviously, as in the embodiment and the other modifications, the configuration in which the illumination device is provided on the rear surface side of another liquid-crystal element including the display panel P can be employed.

Other operational effects provided by the aspect described in the embodiment that are obvious from description of the present specification or at which those skilled in the art can arrive as appropriate should be interpreted to be reasonably provided by the present disclosure.

What is claimed is:

1. A display device comprising:
   a display panel configured to transmit light; and
   an illumination device provided on a rear surface side of the display panel,
   wherein
   the illumination device includes
   a plurality of light sources configured to emit light, and
   a light guiding member that has translucency and is arranged at the rear surface side of the display panel, the light guiding member has a plurality of holes each of which passes through the light guiding member completely in a first direction that intersects a rear surface of the display panel, each of the light sources is housed in a corresponding one of the holes, a rear surface of the light guiding member has a first inclined surface inclined upwardly from a light source housed in one of the holes, a front surface side of the light guiding member has a second inclined surface inclined upwardly from the light source housed in the one of the holes, and an angle of the first inclined surface to a center line of the one of the holes is greater than an angle of the second inclined surface to the center line, a direction of the center line being perpendicular to a main surface of the display panel.

2. The display device according to claim 1, wherein the first inclined surface includes a plurality of slopes that are different in angles with respect to the center line.

3. The display device according to claim 1, wherein the second inclined surface includes a plurality of slopes that are different in angles with respect to the center line.

4. The display device according to claim 3, wherein a projecting portion projecting toward the display panel provided between the second inclined surface at the front surface side.

5. The display device according to claim 4, comprising a covering member on the projecting portion.

6. The display device according to claim 1, wherein
the first inclined surface has a lower end that is an lowermost end from which the first inclined surface extends upward,
the second inclined surface extends to the one of the holes at a lower end that is an lowermost end from which the second inclined surface extends upward, and
the lower end of the second inclined surface is closer to the light source than the lower end of the first inclined surface.

7. The display device according to claim 1,
the angle of the first inclined surface to the center line of the one of the holes, the holes each passes through from a bottom of the light guiding member to a top of the light guiding member in the first direction, is greater than an angle of the second inclined surface to the center line.

8. An illumination device provided on a rear surface side of a liquid-crystal element, the illumination device comprising:
a plurality of light sources; and
a light guiding member that has translucency and is arranged between the light sources,
wherein
the light guiding member has a plurality of holes each of which passes through the light guiding member completely in a first direction that intersects a rear surface of the liquid-crystal element,
each of the light sources is housed in a corresponding one of the holes,
a rear surface of the light guiding member has a first inclined surface inclined upwardly from a light source housed in one of the holes,
a front surface side of the light guiding member has a second inclined surface inclined upwardly from the light source housed in the one of the holes, and
an angle of the first inclined surface to a center line of the one of the holes is greater than an angle of the second inclined surface to the center line, a direction of the center line being perpendicular to a thickness direction of the light guiding member.

9. The illumination device according to claim 8,
wherein the first inclined surface includes a plurality of slopes that are different in angles with respect to the center line.

10. The illumination device according to claim 8,
wherein the second inclined surface includes a plurality of slopes that are different in angles with respect to the center line.

11. The illumination device according to claim 10,
wherein a projecting portion projecting toward the liquid-crystal element.

12. The illumination device according to claim 11, comprising a covering member on the projecting portion.

13. The illumination device according to claim 8, wherein
the first inclined surface has a lower end that is an lowermost end from which the first inclined surface extends upward,
the second inclined surface extends to the one of the holes at a lower end that is an lowermost end from which the second inclined surface extends upward, and
the lower end of the second inclined surface is closer to the light source than the lower end of the first inclined surface.

14. The display device according to claim 8,
the angle of the first inclined surface to the center line of the one of the holes, the holes each passes through from a bottom of the light guiding member to a top of the light guiding member in the first direction, is greater than an angle of the second inclined surface to the center line.

15. A light guiding member having translucency comprising:
a hole passing through the light guiding member completely in a first direction that intersects a rear surface of the light guiding member, so as to house a light source;
a rear surface having a first inclined surface inclined upwardly from a center line of the hole, a direction of the center line being perpendicular to a thickness direction of the light guiding member; and
a front surface having a second inclined surface inclined upwardly from the center line of the hole,
wherein an angle of the first inclined surface to a center line of the hole is greater than an angle of the second inclined surface to the center line.

16. The light guiding member according to claim 15,
wherein the first inclined surface includes a plurality of slopes that are different in angles with respect to the center line.

17. The light guiding member according to claim 15,
wherein the second inclined surface includes a plurality of slopes that are different in angles with respect to the center line.

18. The light guiding member according to claim 15,
wherein a projecting portion projecting upwardly from the front surface.

19. The light guiding member according to claim 18, comprising a covering member on the projecting portion.

20. The light guiding member according to claim 15, wherein the first inclined surface has a lower end that is an lowermost end from which the first inclined surface extends upward, the second inclined surface extends to the one of the holes at a lower end that is an lowermost end from which the second inclined surface extends upward, and the lower end of the second inclined surface is closer to the light source than an lower end of the first inclined surface.

21. The display device according to claim 15, the angle of the first inclined surface to the center line of the one of the holes, the holes each passes through from a bottom of the light guiding member to a top of the light guiding member in the first direction, is greater than an angle of the second inclined surface to the center line.

\* \* \* \* \*